United States Patent [19]

Hutcheson et al.

[11] 4,017,807
[45] Apr. 12, 1977

[54] ELECTRONICALLY CONTROLLED DIGITAL LASER

[75] Inventors: Lynn D. Hutcheson, Tucson, Ariz.; Richard Swart Hughes, China Lake, Calif.

[73] Assignee: The United States of America as represented by the Secretary of the Navy, Washington, D.C.

[22] Filed: Feb. 23, 1976

[21] Appl. No.: 660,586

[52] U.S. Cl. .......................................... 331/94.5 C
[51] Int. Cl.² .......................................... H01S 3/10
[58] Field of Search ................ 331/94.5, ; 332/7.51

[56] References Cited
UNITED STATES PATENTS 3,931,592  1/1976  Hughes .............................. 350/161

Primary Examiner—William L. Sikes
Attorney, Agent, or Firm—R. S. Sciascia; Roy Miller; W. Thom Skeer

[57] ABSTRACT

A tunable organic dye laser having an acoustic-optic beam deflector, a folded Lyot filter and a diffraction grating which produces a periodic, discrete (or digital) output. The period between discrete wavelengths in the output of the laser are easily varied electronically.

4 Claims, 1 Drawing Figure

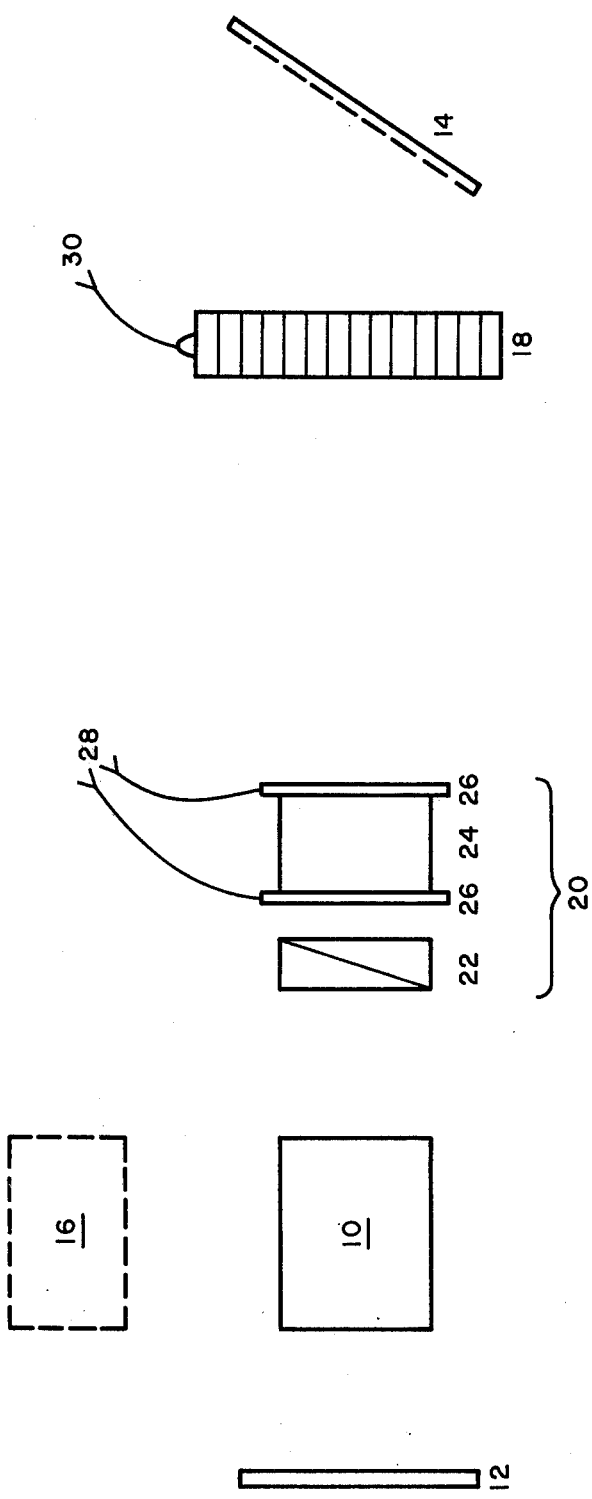

ELECTRONICALLY CONTROLLED DIGITAL LASER

BACKGROUND OF THE INVENTION

The present invention relates to tunable dye lasers, and more particularly to a tunable laser which produces a periodic, discrete output.

The broadband laser emission observed from organic dye lasers provides for a source of continuously tunable coherent radiation. Such tuning has been accomplished by mechanical or electromechanical devices, and more recently by electro-optic or acousto-optic devices. However, there is no broadband laser which produces an output of many discrete wavelengths which can be rapidly addressed and tuned. In order to produce such a device several lasers would have to be used together, or large, inefficient argon-ion type lasers, which have few fixed wavelengths, would have to be used.

SUMMARY OF THE INVENTION

Accordingly, the present invention provides a broadband organic dye laser with a periodic, discrete output. An acousto-optic beam deflector and a folded Lyot filter are inserted inside the organic dye laser cavity with the Lyot filter closest to the dye cell. Such a laser is appropriately called a digital laser.

Other features of the present invention will become more fully apparent from the following description of a preferred embodiment as illustrated in the accompanying drawing.

BRIEF DESCRIPTION OF THE DRAWING

The FIGURE is a plan view of the present invention.

DESCRIPTION OF THE PREFERRED EMBODIMENT

Referring now to the FIGURE, a dye cell 10, containing an organic dye capable of lasing over a broad spectrum of wavelengths (usually a few hundred angstroms), is located in a resonant cavity. An output mirror 12, having partial reflectance and transmission characteristics sufficient to cause laser action over the full spectrum of output wavelengths, is located at one end of the cavity, and a reflection diffraction grating 14, acting as an end reflector, is located at the other end. An acousto-optic beam deflector 18 and a folded Lyot filter 20 are located in the resonant cavity between dye cell 10 and diffraction grating 14, with the acousto-optic beam deflector nearest diffraction grating 14. The folded Lyot filter 20 has a linear polarizer 22 which must be closest to the dye cell 10, a birefringent crystal 24, and two transparent electrodes 26 positioned one on each side of the birefringent crystal 24 along the optical axis. The polarizer 22 is oriented so that its direction of polarization is 45° to the principal axis of the crystal 24, and the reflection of selectable wavelengths by the diffraction grating 14 provides the folding of the Lyot filter. A potential difference 28 is applied to the electrodes 26 to tune the passband of the folded Lyot filter 20, and an RF signal 30 is applied to the acousto-optic beam deflector 18 to tune the laser electronically across the spectrum of output wavelengths.

A Lyot filter, or birefringent filter, has two linear polarizers with a birefringent crystal between them. The polarizers are oriented so that their direction of polarization is 45° to the crystal axis, the crystal axis being perpendicular to the propagation of light. The transmission function of the filter is $$I = \cos^2 \frac{\pi d \Delta n}{\lambda} \quad (1)$$

where $d$ = thickness of the crystal, $\lambda$ = optical wavelength, and $\Delta n$ = difference of the index of refraction between the ordinary and extraordinary beams. The transmission characteristics of a filter like this are generally very broad. However, inside a resonant laser cavity the beam passes through the filter several times which narrows the linewidth.

The free spectral range (separation of the transmission peaks of the filter) of the filter is given by $$\Delta \lambda = \frac{\lambda_o^2}{d(n_o - n_e)} \quad (2)$$

where $\lambda_o$ = center wavelength of the free spectral range, $d$ = crystal length, $n_o$ = index of refraction of the ordinary beam, and $n_e$ = index of refraction of the extraordinary beam ($n_o - n_e = \Delta n$). The indices of refraction $n_o$ and $n_e$ are electric field dependent. Therefore, by applying an electric field along the optic axis ($n_e$) or perpendicular to $n_e$ ($n_o$), the free spectral range can be varied because $\Delta n$ is varied.

Several things can be done to narrow the output linewidth of the filter, one of which is to put more than one filter in the cavity. The lengths of these filters must be integer multiple lengths of the smallest one.

If only one filter is used in the laser cavity, only one linear polarizer and a birefringent crystal half the length necessary is needed. The optical beam goes through the linear polarizer 22 and the crystal 24, reflects off the diffraction grating 14, and then goes back through the crystal and polarizer. This multi path transmission characterizes the filter 20 to be of the folded Lyot type.

By appropriate means, determined by the length, $d$, of the crystal 24, by the material of the crystal, and by the electric field across the crystal which varies $\Delta n$, a Lyot filter 20 can be made to digitally select the desired wavelengths. By selecting the proper RF frequency applied to the acousto-optic beam deflector, the desired wavelength from the output spectrum can be selected, or the output wavelengths can be digitally scanned by digitally tuning the laser. Any combination can be used to give any wavelength and free spectral range desired, and practically all wavelengths can be obtained by using different lasing materials.

The result of the present invention is a portable, rapid scanning laser with no moving parts which produces an output spectrum of periodic, discrete wavelengths over a broad spectral range. Obviously, many modifications and variations of the present invention are possible in the light of the above teachings. It is, therefore, to be understood that, within the scope of the appended claims, the invention may be practiced otherwise than as specifically described.

What is claimed is:

1. An electronically controlled digital laser comprising:
    a resonant laser cavity having a lasing cell, and bounded at one end by a laser output mirror;
    a reflective grating positioned angularly for retroreflecting those wavelengths that are incident thereon at the retroreflective angle unique to each wavelength, said reflective grating being located at the end of said cavity opposite to said output mirror;

means for deflecting an intracavity laser beam in response to an electrical signal, said deflecting means located in said cavity adjacent said retroreflecting means;

an electronically tunable bandpass filter located in said cavity adjacent said lasing cell and in optical alignment therewith; and means for tuning the passband of said filter.

2. The electronically controlled digital laser as recited in claim 1 wherein said filter comprises:

a birefringent crystal in optical alignment with said lasing cell; and a linear polarizer closest to said lasing cell, said polarizer being oriented at 45° to the crystal axis of said crystal, whereby together with said retroreflecting means said filter forms a folded Lyot filter.

3. The electronically controlled digital laser as recited in claim 2 wherein said tuning means comprises:

two transparent electrodes positioned on each side of said crystal along the optical axis of said cavity; and means for applying a variable differential potential to said electrodes.

4. The electronically controlled digital laser as recited in claim 1 wherein said filter comprises a plurality of filter elements, each of said elements having a birefringent crystal capable of being tuned electronically and a linear polarizer closest to said lasing cell, said polarizer being oriented at 45° to the crystal axis of said crystal.

* * * * *